US009378706B2

(12) United States Patent
Cha

(10) Patent No.: US 9,378,706 B2
(45) Date of Patent: Jun. 28, 2016

(54) DISPLAY METHOD AND ELECTRONIC DEVICE THEREOF

(71) Applicant: Samsung Electronics Co. Ltd., Suwon-si, Gyeonggi-do (KR)

(72) Inventor: Hyun-Sik Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 13/889,745

(22) Filed: May 8, 2013

(65) Prior Publication Data

US 2013/0321486 A1 Dec. 5, 2013

(30) Foreign Application Priority Data

May 30, 2012 (KR) ........................ 10-2012-0057522

(51) Int. Cl.

| | |
|---|---|
| ***G09G 5/10*** | (2006.01) |
| ***G09G 3/36*** | (2006.01) |
| ***G06F 3/038*** | (2013.01) |
| ***G09G 5/00*** | (2006.01) |
| ***G09G 3/32*** | (2016.01) |

(52) U.S. Cl.

CPC ................ *G09G 5/10* (2013.01); *G09G 3/3225* (2013.01); *G09G 2320/0233* (2013.01); *G09G 2330/021* (2013.01); *G09G 2330/12* (2013.01)

(58) Field of Classification Search

CPC .................... G09G 2300/0861; G09G 3/3233; G09G 2320/043; G09G 2300/0842; G09G 2300/0819; G09G 3/3291; G09G 2320/045; G09G 2320/0626; G09G 2320/041

See application file for complete search history.

(56) References Cited

U.S. PATENT DOCUMENTS

| | | | | |
|---|---|---|---|---|
| 2005/0285822 | A1* | 12/2005 | Reddy et al. | 345/76 |
| 2007/0126757 | A1* | 6/2007 | Itoh et al. | 345/690 |
| 2007/0285379 | A1* | 12/2007 | Jung | G09G 3/342<br>345/102 |
| 2008/0042943 | A1* | 2/2008 | Cok | 345/77 |
| 2011/0069096 | A1* | 3/2011 | Li et al. | 345/690 |
| 2012/0105402 | A1* | 5/2012 | Huang | 345/207 |

* cited by examiner

*Primary Examiner* — Alexander Eisen
*Assistant Examiner* — Nan-Ying Yang
(74) *Attorney, Agent, or Firm* — Jefferson IP Law, LLP

(57) ABSTRACT

A uniform display method and an apparatus of a self-luminous display device are provided. In the method, a brightness value of an image to display is determined. An amount of a supply current corresponding to the image is controlled depending on the brightness value of the image. And the controlled amount of current is supplied to a self-light emitting device.

14 Claims, 10 Drawing Sheets

DISPLAY METHOD AND ELECTRONIC DEVICE THEREOF

PRIORITY

This application claims the benefit under 35 U.S.C. §119 (a) of a Korean patent application filed on May 30, 2012 in the Korean Intellectual Property Office and assigned Serial No. 10-2012-0057522, the entire disclosure of which is hereby incorporated by reference.

BACKGROUND OF THE INVENTION

1. Field of the Invention

The present invention relates to display method and an electronic device thereof. More specifically, the present invention relates to a method and an apparatus for uniform display of an electronic device having a self-luminous display device.

2. Description of the Related Art

Recently, a self-luminous display device such as an Active Matrix Organic Light Emitting Diodes (AMOLED) having excellent brightness characteristic viewing angle characteristics, is in the limelight as the next generation display device. Accordingly, electronic devices using a self-luminous display device has increased.

The self-luminous display device can provide a high contrast ratio and color expression having a depth using self luminance by an organic material. Based on these visual characteristics, the self-luminous display strongly appeals to a user. However, due to a characteristic in which the light emitting efficiency of respective Red/Green/Blue (R/G/B) active matrixes forming three primary colors is non-linearly reduced in a low brightness region, the self-luminous display device has a disadvantage in that a stain (i.e., non-uniform light emission phenomenon) occurs in a dark region.

Therefore, there is a need for an improved apparatus and method for removing a non-uniform light emission phenomenon in a dark region when displaying a screen using a self-luminous display device in an electronic device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for uniform display of an electronic device having a self-luminous display device.

Another aspect of the present invention is to provide a method and an apparatus for preventing non-uniform light emission from occurring in a dark image by controlling an amount of current consumption depending on a brightness value of an image in an electronic device having a self-luminous display device.

Another aspect of the present invention is to provide a method and an apparatus for controlling light emission of a self-luminous display device by controlling an amount of current to be supplied to the self-luminous display device depending on a brightness value of an image in an electronic device.

Another aspect of the present invention is to provide a method and an apparatus for conserving a total amount of consumed energy by controlling a current supply time when controlling an amount of current to be supplied to a self-luminous display device in an electronic device.

Another aspect of the present invention is to provide a method and an apparatus for operating in a non-uniform light emission remove mode or a general mode by comparing a voltage representing a brightness value of an image with a threshold voltage in an electronic device.

Another aspect of the present invention is to provide a method and an apparatus for preventing mode switching between a non-uniform light emission remove mode and a general mode from frequently occurring depending on a dynamically changing image brightness value when reproducing a moving picture in an electronic device.

In accordance with an aspect of the present invention, a display method using a self-luminous display device in an electronic device is provided. The method includes determining a brightness value of an image to display, controlling an amount of a supply current corresponding to the image depending on the brightness value of the image, and supplying the controlled amount of current to a self-light emitting device.

In accordance with another aspect of the present invention, an electronic device is provided. The electronic device includes a self-luminous display device including a plurality of self-light emitting devices, one or more processors, a memory, and one or more programs stored in the memory and configured for execution by the one or more processors, wherein the one or more programs include an instruction for determining a brightness value of an image to display, controlling an amount of a supply current corresponding to the image depending on the brightness value of the image, and controlling to supply the controlled amount of the current to the self-light emitting devices.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for controlling light emission of a self-luminous display device by controlling an amount of current to be supplied to the self-luminous display device depending on a brightness value of an image in an electronic device.

Figure 1A:
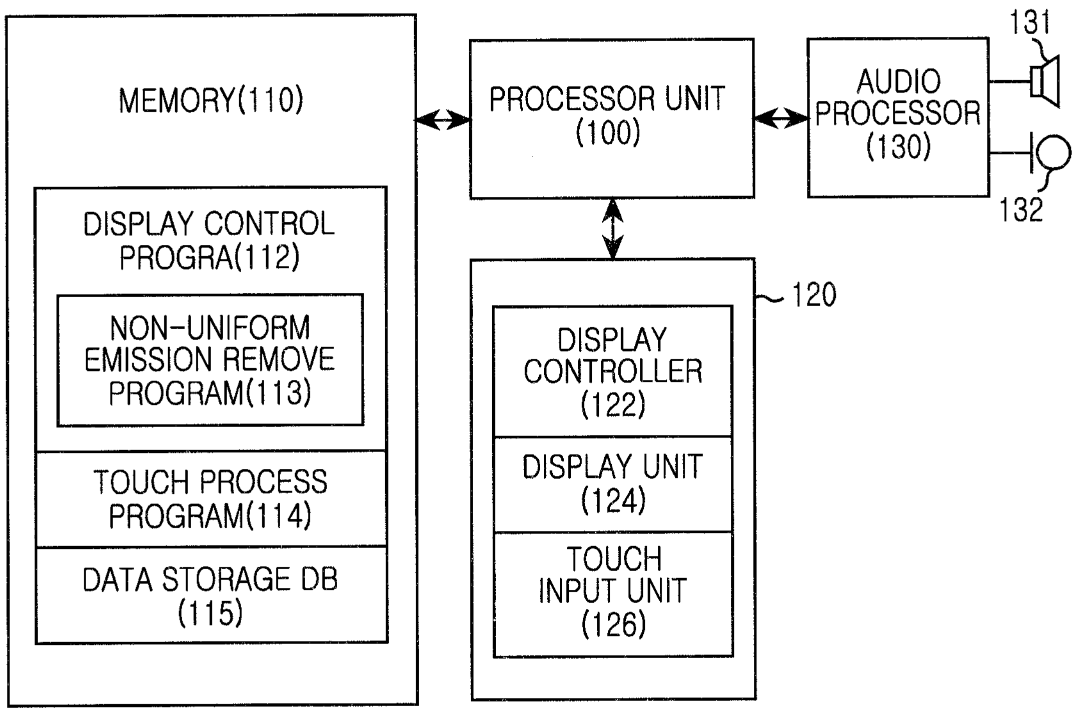
FIG. 1A is a block diagram illustrating an electronic device according to an exemplary embodiment of the present invention.
Figure 3:
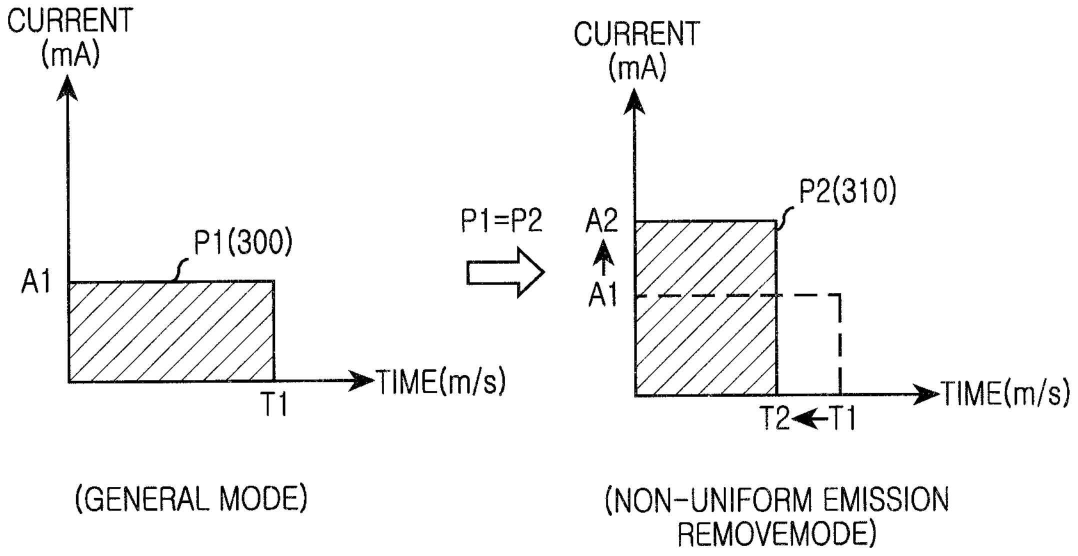
FIG. 3 is a view illustrating a current supply method for each mode in an electronic device according to an exemplary embodiment of the present invention.

FIG. 1A is a block diagram illustrating an electronic device according to an exemplary embodiment of the present invention. FIG. 3 is a view illustrating a current supply method for each mode in an electronic device according to an exemplary embodiment of the present invention.

Referring to FIG. 1A, the electronic device includes a processor unit 100, a memory 110, a touchscreen 120, an audio processor 130, a speaker 131, and a microphone 132.

The processor unit 100 may include one or more processors. The processor unit 100 executes various software programs to control and process an overall operation of the electronic device. For example, the processor unit 100 may execute a software program stored in the memory 110 to perform a corresponding function.

More particularly, the processor unit 100 may execute a non-uniform light emission program 113 stored in the memory 110 to control and process a function for preventing a non-uniform light emission phenomenon from occurring due to a characteristic that an emission efficiency of a self-light emitting device reduces non-linearly in a low brightness region when displaying a dark image on a display unit 124. More specifically, the processor unit 100 receives a brightness value of an image, that is, a Y value representing the brightness and the grayscale of the image from a display controller 122 included in the touchscreen 120, and compares the received Y value with a threshold value to determine a current supply mode for the self-light emitting device, and to control and process a function for operating in the determined mode. Here, the Y value representing the brightness value of the image is a value obtained by multiplying a ratio of turn-on over all pixels of a panel, that is, an ON PIXEL RATIO (OPR) and Red/Green/Blue (R/G/B) sub pixel constituent ratios by a specific coefficient. The Y value represents the brightness and grayscale information of an image to be displayed on a screen.

A current supply mode for a self-light emitting device according to an exemplary embodiment of the present invention may be divided into a general mode and a non-uniform emission remove mode. The general mode is a mode for performing display as known in the related art, and denotes a mode for providing a current corresponding to an image to be displayed to a self-light emitting device for a predetermined current supply time. In contrast, the non-uniform emission remove mode is an exemplary mode proposed by the present invention, and denotes a mode for reducing a current supply time by a predetermined amount or a predetermined ratio, increasing an amount of current corresponding to an image to be displayed by a predetermined amount or a predetermined ratio, and providing an increased amount of current to a self-light emitting device for the reduced current supply time to improve an emission efficiency. Here, the non-uniform emission remove mode may improve the emission efficiency while consuming the same amount of current as an amount of current consumed in the case where the electronic device operates in the general mode by reducing a supply time of the current while increasing an amount of the current to be supplied. Through this, the exemplary embodiments of present invention may improve the brightness uniformity by improving an individual emission efficiency of R/G/B sub pixels set in the entire panel of the electronic device.

When a Y value is less than a threshold, the processor unit 100 determines that the relevant image is a dark image, and determines a current supply mode for a self-light emitting device as the non-uniform emission remove mode in order to prevent a non-uniform emission phenomenon from occurring. In contrast, when the Y value is equal to or greater than the threshold, the processor unit 100 determines that the relevant image is a bright image, and determines the current supply mode for the self-light emitting device as the general mode. When the current supply mode for the self-light emitting device is determined, the processor unit 100 provides a signal requesting to operate in the determined mode to the display controller 122.

The memory 110 stores various programs including instructions for an overall operation of the electronic device and data. The memory 110 may include at least one of a high speed random access memory such as a magnetic disk storage and/or a non-volatile memory, one or more optical storages, and/or a flash memory (e.g., NAND, NOR, etc.).

Various programs stored in the memory 110 may include a display control program 112, and a touch process program 114.

The display control program 112 includes various instructions for displaying various graphics on the display unit 124 by controlling the display controller 122 included in the touchscreen 120. Here, the graphics may include text, a web page, an icon, a digital image, a video, an animation, etc. That is, the display control program 112 includes an instruction for controlling to display graphics corresponding to a function executed by the processor unit 100. More particularly, the display control program 112 includes a non-uniform emission remove program 113 including an instruction for determining a current supply mode for a self-light emitting device depending on a Y value of an image to be displayed on the display unit 124 and switching to the determined mode to operate in the same mode.

Also, the touch process program 114 includes an instruction for controlling to detect a touch input for a touch input unit 126 forming the touchscreen 120. That is, the touch process program 114 detects a user selection for an image or a moving picture to be displayed on the display unit 124.

Also, the memory 110 includes a data storage DataBase (DB) 115. The data storage DB 115 is a DB for storing various data required for an operation of the electronic device, and may store an image and a moving picture to be displayed on the touchscreen 120. Also, the data storage DB 115 may store a threshold for a Y value. At this point, the threshold may be changed by a designer or a user. For example, the Y value may be initially set and changed to another value by the designer and the user.

The touchscreen 120 provides an interface for an input and an output between the electronic device and the user. That is, the touchscreen 120 includes the display controller 122, the display unit 124, and the touch input unit 126. The touchscreen 120 serves as a medium for detecting the user's touch input, for transferring the detected touch input to the processor unit 100, and for displaying an output from the processor unit 100 and providing the same to the user.

The display controller 122 is a device for controlling display of the display unit 124. For example, the display controller 122 may be a display driver Integrated Circuit (IC). The display controller 122 may perform an operation for controlling display via the display control program 112. The display controller 122 controls self-light emitting devices of R/G/B sub pixels for respective display pixels forming the display unit 124, and corresponding transistors. For example, the display controller 122 controls on/off of a transistor corresponding to each self-light emitting device, and supplies a current to each self-light emitting device.

More particularly, the display controller 122 controls an amount of current supplied to each self-light emitting device forming the display unit 124 and a current supply time for each self-light emitting device depending on an operating mode determined by the brightness value of an image under control of the processor unit 100. That is, the display controller 122 obtains a Y value representing the brightness value of an image to be displayed on the display unit 124 under control of the processor unit 100, and provides the obtained Y value to the processor unit 100. Here, the Y value representing the brightness value of the image is a relative brightness value of the image. The Y value may be an average brightness value for the entire image obtained by setting a brightest portion of the relevant image to 255, and setting a darkest portion of the relevant image to 0. After that, the display controller 122 receives a signal representing an operation in the general mode or the non-uniform emission remove mode from the processor unit 100. When receiving a signal representing operation in the general mode from the processor unit 100, the display controller 122 turns on/off transistors corresponding to respective sub pixels and supplies a current corresponding to the relevant image to respective self-light emitting devices in order to display the image to be displayed on the display unit 124 as known in the conventional art.

In contrast, when receiving a signal representing an operation in the non-uniform emission remove mode from the processor unit 100, the display controller 122 turns on/off transistors corresponding to respective sub pixels and supplies a current increased by a predetermined amount or a predetermined ratio compared to an amount of current corresponding to the relevant image to respective self-light emitting devices in order to display the image. At this point, the display controller 122 reduces a time for which the current is supplied to the respective self-light emitting devices by a predetermined time or a predetermined ratio in order to conserve a total amount of energy. That is, as illustrated in FIG. 3, assuming a case where the display controller 122 operating in the general mode supplies a current A1 for a time T1 in order to display a specific image on the display unit 124, the display controller 122 operating in the non-uniform emission remove mode supplies a current A2, which is greater than A1, for a time T2, which is smaller than the time T1, in order to display the specific image on the display unit 124. Therefore, the total amount P1 300 of current consumed in the general mode for the relevant image, and the total amount P2 310 of current consumed in the non-uniform emission remove mode are the same. More specifically, for example, it is assumed that the display controller 122 turns on and off a self-light emitting device forming the display unit 124 sixty times at a frame rate of 60 Hz to represent relevant brightness, and accordingly, for one time of flickering, the display controller 122 supplies an amount A of current representing brightness of 100 candela (cd) to respective self-light emitting devices for 16.7 ms. At this point, when operating in the general mode, for one time of flickering, the display controller 122 supplies an amount A of current to the respective self-light emitting devices for 16.7 ms. In contrast, when operating in the non-uniform emission remove mode, for one time of flickering, the display controller 122 may supply an amount of current corresponding to twice that of the amount A to the respective self-light emitting devices for 8.35 ms which is half of 16.7 ms. That is, while operating in the non-uniform emission remove mode, the display controller 124 expresses brightness for only half the time as compared to the expressed time in the general mode, and instead, increases an amount of current contributing to the additional brightness for the reduced time, so that the display controller 124 supplies a higher current to the self-light emitting device within a range where a user cannot recognize a change in the brightness and distributes linear emission efficiency over the entire panel, thereby preventing non-uniform emission phenomenon from occurring on the dark region of the relevant image.

The display unit 124 uses an Active Matrix Organic Light Emitting Diode (AMOLED) display technology, which is an active self-luminous display technology in which light is generated while an electron and a hole combine in an organic layer when a current flows through a fluorescent or phosphorescent organic thin film. The display unit 124 includes transistors corresponding to R/G/B sub pixels for respective display pixels forming the screen, and controls light emission of a corresponding self-light emitting device depending on a current supplied to respective transistors from the display controller 122. That is, the display unit 124 is supplied with a current by turning on/off a transistor corresponding to each sub pixel under control of the display controller 122, and allows a self-light emitting device corresponding to each transistor to emit light depending on an amount of a supplied current, thereby expressing the color and the brightness of each pixel for an image to be displayed.

The touch input unit 126 includes a touch sensor to detect a touch for the display unit 124. The touch input unit 126 detects user selection for an image or a moving picture to be displayed on the display unit 124 under control of the touch process program 114, and provides the detected result to the processor unit 100.

The audio processor 130 combines with the speaker 131 and the microphone 132 to perform a function for outputting and receiving an audio signal. When reproducing a moving picture, the audio processor 130 performs a function for outputting a relevant audio signal under control of the processor unit 100.

Figure 1B:
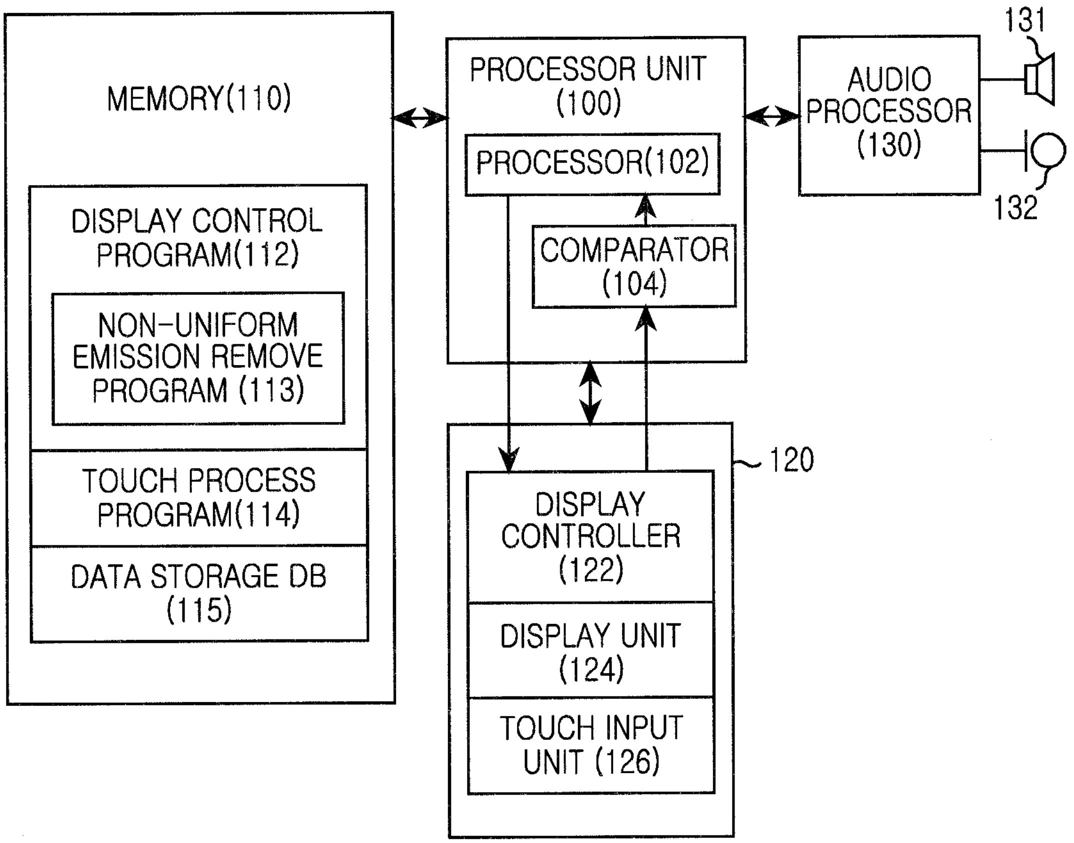
FIG. 1B is a block diagram illustrating an electronic device according to an exemplary embodiment of the present invention.
Figure 1C:
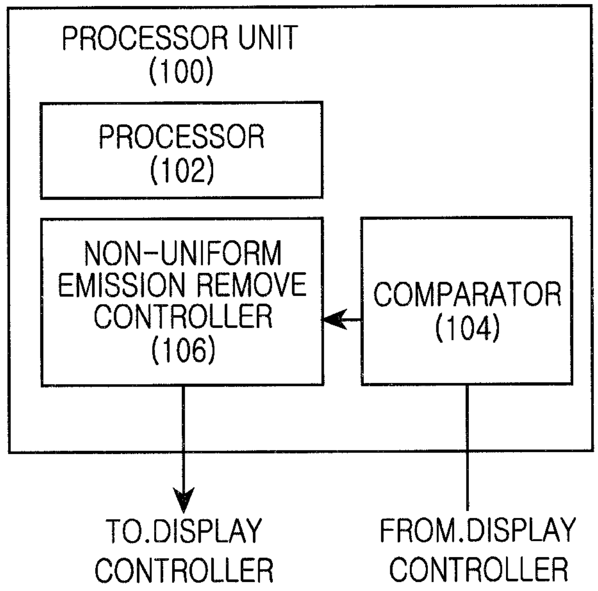
FIG. 1C is a block diagram illustrating a processor unit in an electronic device according to an exemplary embodiment of the present invention.
Figure 2A:
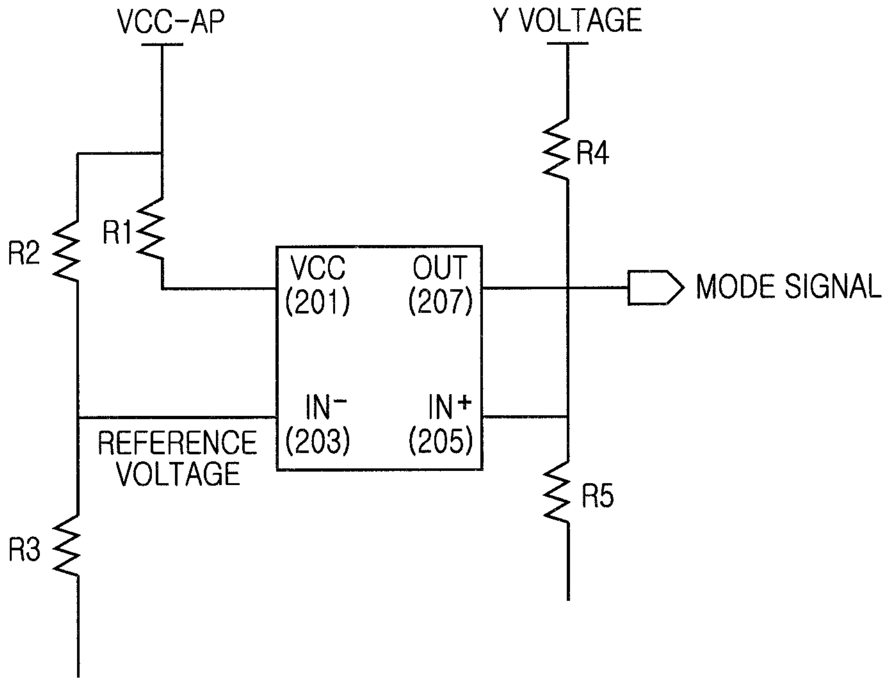
FIG. 2A is a view illustrating construction of a comparator in an electronic device according to an exemplary embodiment of the present invention.
Figure 2B:
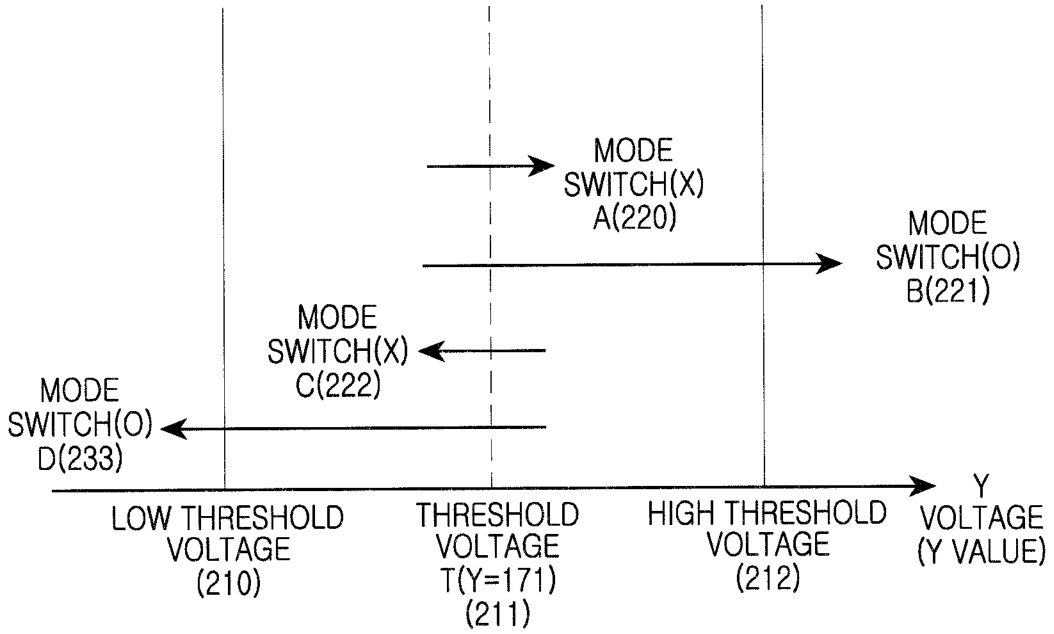
FIG. 2B is a view illustrating a method for comparing a brightness value of an image with a threshold section and determining mode switching in an electronic device according to an exemplary embodiment of the present invention.

FIG. 1B is a block diagram illustrating an electronic device according to an exemplary embodiment of the present invention. FIG. 1C is a block diagram illustrating a processor unit in an electronic device according to an exemplary embodiment of the present invention. FIG. 2A is a view illustrating construction of a comparator in an electronic device according to an exemplary embodiment of the present invention. FIG. 2B is a view illustrating a method for comparing a brightness value of an image with a threshold section and determining mode switching in an electronic device according to an exemplary embodiment of the present invention.

Referring to FIG. 1B, the electronic device includes a processor unit 100, a memory 110, a touchscreen 120, an audio processor 130, a speaker 131, and a microphone 132.

The processor unit 100 may include one or more processors 102. The processor unit 100 executes various software programs to control and process an overall operation of the electronic device. In addition, the processor unit 100 executes a software program stored in the memory 110 to perform a corresponding function. The processor unit 100 may include hardware and/or software and/or a combination of these. More particularly, the processor unit 100 may include a comparator 104. According to exemplary implementations, the comparator 104 may be a hardware element and/or a software element. Here, though a case where the comparator 104 is included in the processor unit 100 is described, it is to be understood that this is merely an example and that the comparator 104 may be positioned external to the processor unit 100, may be included inside a display controller 122 of the touchscreen 120, and the like depending on a design scheme.

The processor unit 100 executes a non-uniform emission remove program stored in the memory 110 to control and process a function for preventing a non-uniform emission phenomenon from occurring due to a characteristic that an emission efficiency of a self-light emitting device reduces non-linearly in a low brightness region when displaying a dark image on a display unit 124.

In implementation, the comparator 104 of the processor unit 100 receives a voltage (referred to as a ‘Y voltage’ for convenience in description) corresponding to a Y value representing the brightness value of an image from the display controller 122 included in the touchscreen 120, and compares the received Y voltage with a threshold voltage to provide a comparison result to the processor 102. For example, the comparator 104 may be configured as illustrated in FIG. 2A to compare the received Y voltage with the threshold voltage. When the Y voltage is less than the threshold voltage, the comparator 104 outputs a signal representing a non-uniform emission remove mode. When the Y voltage is equal to or greater than the threshold voltage, the comparator 104 outputs a signal representing a general mode. Here, the comparator 104 may be provided with power from a VCC terminal 201, a reference voltage from an IN− terminal 203, and a Y voltage from an IN+ terminal 205, and compares the reference voltage with the Y voltage to output a mode signal representing the non-uniform emission remove mode or the general mode to an OUT terminal 207 depending on the comparison result. For another example, the comparator 104 may be a hysteresis comparator (not shown). That is, in case of using a comparator as illustrated in FIG. 2A, a phenomenon in which a Y voltage continuously changes depending on the brightness value of each image forming a moving picture when an electronic device reproduces the moving picture, so that mode switching between the non-uniform emission remove mode and the general mode frequently occurs, may occur. Therefore, as another exemplary embodiment of the present invention, when reproducing a moving picture, the electronic device may perform the mode switching using the hysteresis comparator in order to prevent the mode switching from occurring too frequently. At this point, the comparator 104 may be a hysteresis comparator that normally feeds back a hysteresis voltage obtained by dividing a partial voltage of an output signal, and changes the output signal when an input Y voltage is greater or less than a reference voltage by the hysteresis voltage. For example, as illustrated in FIG. 2B, with respect to a threshold voltage T 211, a case in which a voltage lower by the hysteresis voltage is a low threshold voltage 210, a voltage higher by the hysteresis voltage is a high threshold voltage 212, and a current mode is the non-uniform emission remove mode is assumed. At this point, when a received Y voltage is greater than the threshold voltage T 211 but less than the high threshold voltage 212 (e.g., A, 220), the comparator 104 may output a signal for maintaining the non-uniform emission remove mode without switching to the general mode. In contrast, when the received Y voltage is greater than the threshold voltage T 211 and greater than the high threshold voltage 212 (e.g., B, 221), the comparator 104 may output a signal for switching from the non-uniform emission remove mode to the general mode. After that, when the received Y voltage is less than the threshold voltage T 211 but greater than the low threshold voltage 210 (e.g., C, 222), the comparator 104 may output a signal for maintaining the general mode without switching to the non-uniform emission remove mode. Also, when the received Y voltage is less than the threshold voltage T 211 and less than the low threshold voltage 210 (e.g., D, 223), the comparator 104 may output a signal for switching from the general mode to the non-uniform emission remove mode. As described above, according to an exemplary embodiment of the present invention, the electronic device uses the hysteresis comparator as the comparator 104 to prevent a phenomenon in which mode switching between the non-uniform emission remove mode and the general mode occurs too frequently even when the Y voltage continuously changes depending on the brightness value of each image forming a moving picture when reproducing the moving picture.

The processor 102 determines a mode corresponding to an output signal from the comparator 104 and provides a signal requesting to operate in the determined mode to the display controller 122.

The memory 110 stores various programs including instructions for an overall operation of the electronic device and data. The memory 110 may include at least one of a high speed random access memory such as a magnetic disk storage and/or a non-volatile memory, one or more optical storages, and/or a flash memory (ex: NAND, NOR).

Various programs stored in the memory 110 may include a display control program 112 and a touch process program 114.

The display control program 112 includes various instructions for controlling the display controller 122 included in the touchscreen 120 to display various graphics on the display unit 124. Here, graphics may include text, a web page, an icon, a digital image, a video, an animation, etc. That is, the display control program 112 includes an instruction for controlling to display graphics corresponding to a function executed by the processor unit 100 on the display unit 124. More particularly, the display control program 112 includes a non-uniform emission remove program 113 including an instruction for converting a Y value of an image to be displayed on the display unit 124 to a Y voltage, determining a current supply mode for a self-light emitting device depending on the converted Y voltage, and operating in the determined mode.

Also, the touch process program 114 includes an instruction for controlling to detect a touch input for a touch input unit 126 forming the touchscreen 120. That is, the touch process program 114 detects a user selection for an image or a moving picture to be displayed on the display unit 124.

Also, the memory 110 includes a data storage DB 115. The data storage DB 115 is a DB for storing various data required for an operation of the electronic device, and can store an image and a moving picture to be displayed on the touchscreen 120. Also, the data storage DB 115 may store a threshold voltage for a Y voltage. At this point, the threshold voltage may be changed by a designer and a user.

The touchscreen 120 provides an interface for an input and output between the electronic device and the user. That is, the touchscreen 120 includes a display controller 122, a display unit 124, and a touch input unit 126. The touchscreen 120 serves as a medium for detecting the user's touch input, transferring the user's touch input to the processor unit 100, and displaying an output from the processor unit 100 and providing the same to the user.

The display controller 122 is a device for controlling the display of the display unit 124. The display controller 122 may be a display driver IC. The display controller 122 may perform an operation for controlling display using a display control program 112. The display controller 122 controls self-light emitting devices of R/G/B sub pixels for respective display pixels forming the display unit 124, and corresponding transistors. For example, the display controller 122 controls on/off of a transistor corresponding to each self-light emitting device, and supplies a current to each self-light emitting device.

More particularly, the display controller 122 controls an amount of current supplied to each self-light emitting device forming the display unit 124 and a current supply time for each self-light emitting device depending on an operating mode determined by the brightness value of an image to be displayed under control of the processor 102. That is, the display controller 122 obtains a Y value representing the brightness value of an image to be displayed on the display unit 124 under control of the processor 102, and converts the obtained Y value to a Y voltage to provide the same to a comparator 104 included in the processor unit 100. Here, the Y value representing the brightness value of the image is a value representing relative brightness depending on the brightness and the grayscale of an image. The Y value may be an average brightness value for the entire image obtained by setting a brightest portion of the relevant image to, e.g., 255, and setting a darkest portion of the relevant image to, e.g., 0. After that, the display controller 122 receives a signal representing operation in the general mode or the non-uniform emission remove mode from the processor 102. When receiving a signal representing operation in the general mode from the processor 102, the display controller 122 turns on/off transistors corresponding to respective sub pixels and supplies a current corresponding to the relevant image to respective self-light emitting devices in order to display the color of the image to be displayed on the display unit 124 as known in the related art.

In contrast, when receiving a signal representing operation in the non-uniform emission remove mode from the processor 102, the display controller 122 turns on/off transistors corresponding to respective sub pixels and supplies a current increased by a predetermined amount or a predetermined ratio compared to an amount of current corresponding to the relevant image to respective self-light emitting devices in order to display the image. At this point, the display controller 122 reduces a time for which the current is supplied to the respective self-light emitting devices by a predetermined time or a predetermined ratio in order to conserve a total amount of energy. That is, as illustrated in FIG. 3, assuming a case in which the display controller 122 operating in the general mode supplies a current A1 for a time T1 in order to display a specific image on the display unit 124, the display controller 122 operating in the non-uniform emission remove mode supplies a current A2, which is greater than A1, for a time T2, which is smaller than the time T1, in order to display the specific image on the display unit 124.

The display unit 124 uses an Active Matrix Organic Light Emitting Diode (AMOLED) display technology, which is an active self-luminous display technology in which light is generated while an electron and a hole combine in an organic layer when a current flows through a fluorescent or phosphorescent organic thin film. The display unit 124 includes transistors corresponding to R/G/B sub pixels for respective display pixels forming the screen, and controls light emission of a corresponding self-light emitting device depending on a current supplied to respective transistors from the display controller 122. That is, the display unit 124 is supplied with a current by turning on/off a transistor corresponding to each sub pixel under control of the display controller 122, and allows a self-light emitting device corresponding to each transistor to emit light depending on an amount of a supplied current, thereby expressing the color and the brightness of each pixel for an image to be displayed.

The touch input unit 126 includes a touch sensor to detect a touch for the display unit 124. The touch input unit 126 detects user selection for an image or a moving picture to be displayed on the display unit 124 under control of the touch process program 114, and provides the detected result to the processor unit 100.

The audio processor 130 combines with the speaker 131 and the microphone 132 to perform a function for outputting and receiving an audio signal. When reproducing a moving picture, the audio processor 130 performs a function for outputting a relevant audio signal under control of the processor unit 100.

In FIGS. 1A and 1B, the processor unit 100 controls an operation in the non-uniform emission remove mode or the general mode depending on an image brightness value by executing the non-uniform emission remove program 113 stored in the memory 110. However, the above operation may be performed by a self operation of the processor unit 100, not by execution of the separate program stored in the memory by the processor unit 100. That is, as illustrated in FIG. 1C, the processor unit 100 may directly perform the function of the non-uniform emission remove program 113 illustrated in FIGS. 1A and 1B via a non-uniform emission remove controller 106 by including the non-uniform emission remove controller 106 besides the processor 102. Of course, at this point, the non-uniform emission remove controller 106 may be configured so that it is included inside the processor 102, and the comparator 104 may not be included in the processor unit 100 depending on a design scheme.

Also, FIGS. 1A and 1B illustrate a construction where, in case of displaying one image, the electronic device compares a Y value of the relevant image with a threshold to determine an operation mode, and in case of reproducing a moving picture, the electronic device compares a Y voltage of a Y value of each image forming the moving picture with a threshold voltage to determine an operation mode. However, this may change depending on a design scheme. That is, in case of displaying one image, the electronic device may compare a Y voltage of a Y value of the relevant image with the threshold voltage, and in case of reproducing a moving picture, the electronic device may compare a Y value of each image forming the moving picture with the threshold.

Figure 4:
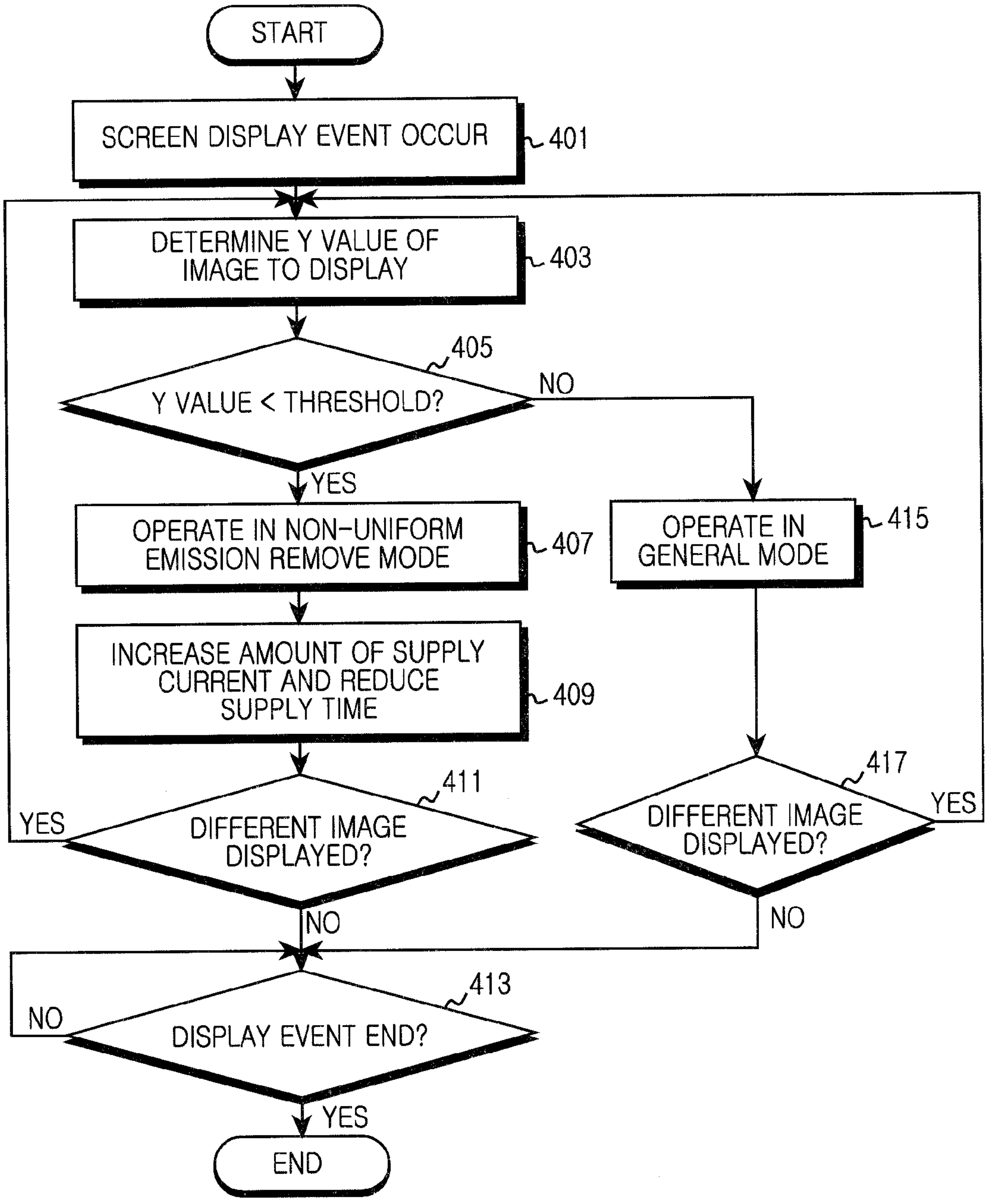
FIG. 4 is a flowchart illustrating a procedure for displaying an image depending on an image brightness value in an electronic device according to an exemplary embodiment of the present invention.

FIG. 4 illustrates a procedure for displaying an image depending on an image brightness value in an electronic device according to an exemplary embodiment of the present invention.

Referring to FIG. 4, the electronic device detects that a screen display event occurs in step 401. For example, the electronic device detects that a specific image display function is selected or a specific moving picture reproduction function is selected depending on a user's touch.

The electronic device determines a Y value representing the brightness value of an image to display in step 403. The electronic device accesses the display controller 122, that is, a specific register value of the display driver IC to determine a Y value of the image to display. Here, the Y value of the image denotes a relative brightness depending on the brightness and the grayscale of the image. The Y value may be an average brightness value for the entire image obtained by setting a brightest portion of the relevant image to, e.g., 255, and setting a darkest portion of the relevant image to, e.g., 0.

The electronic device determines whether the Y value of the image is less than a threshold in step 405. When the Y value of the image is equal to or greater than the threshold, the electronic device proceeds to step 415 to operate in the general mode. At this point, the electronic device allows respective self-light emitting devices to emit light depending on a supplied amount of current and express the color and the brightness of a relevant image by controlling the display driver IC to provide a current corresponding to the image to be displayed to the self-light emitting devices for a predetermined current supply time. The electronic device proceeds to step 417 to determine whether an event for displaying a different image occurs. When the event for displaying the different image occurs, the electronic device returns to step 403 to re-perform subsequent steps. In contrast, when the event for displaying the different image does not occur, the electronic device proceeds to step 413 to determine whether a display event ends. When a display event end occurs in step 413, the electronic device ends the procedure according to the present invention.

In contrast, when the Y value of the image is less than the threshold, the electronic device switches to the non-uniform emission remove mode in step 407, and proceeds to step 409 to reduce a current supply time by a predetermined amount or a predetermined ratio, increase an amount of current corresponding to an image to be displayed by a predetermined amount or a predetermined ratio, and provide the increased amount of the current to the self-light emitting devices for the reduced current supply time. Accordingly, respective self-light emitting devices forming the display unit 124 of the electronic device may emit light depending on supplied amounts of current to express the color and the brightness of the relevant image. When a Y value of the image is less than a threshold, the electronic device may switch to the non-uniform emission remove mode to express brightness using a higher amount of current for a shorter time than the general mode, and distribute a linear emission efficiency over the entire panel within a range in which the user cannot recognize a brightness change, so that occurrence of the non-uniform emission phenomenon in a dark region of the relevant image can be prevented.

The electronic device proceeds to step 411 to determine whether an event for displaying a different image occurs. When the event for displaying the different image occurs, the electronic device returns to step 403 to re-perform subsequent steps. In contrast, when the event for displaying the different image does not occur, the electronic device proceeds to step 413 to determine whether a display event ends. When a display event end event occurs in step 413, the electronic device ends the procedure according to the present invention.

Figure 5:
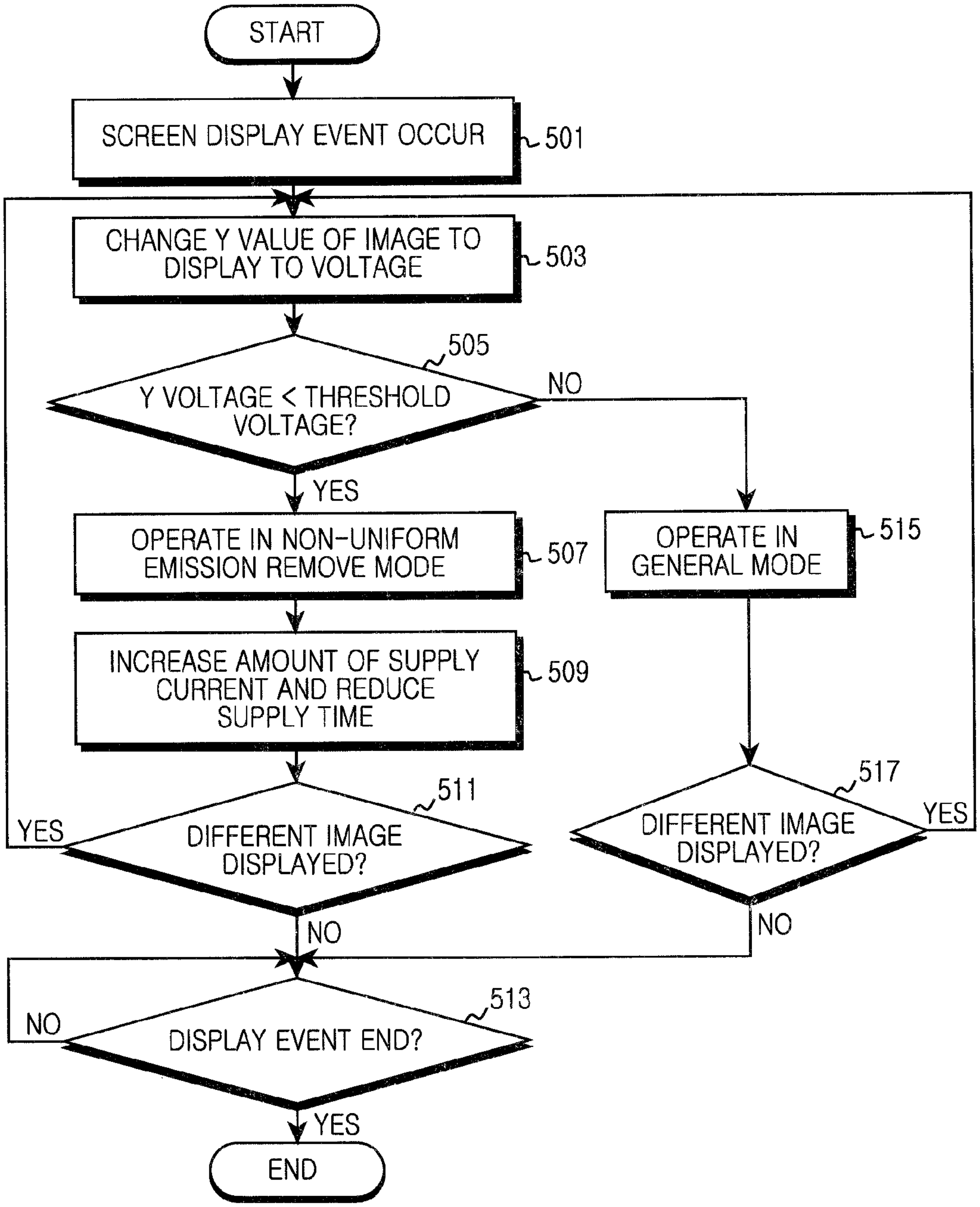
FIG. 5 is a flowchart illustrating a procedure for displaying an image depending on a voltage representing an image brightness value in an electronic device according to an exemplary embodiment of the present invention.

FIG. 5 illustrates a procedure for displaying an image depending on a voltage representing an image brightness value in an electronic device according to an exemplary embodiment of the present invention.

Referring to FIG. 5, the electronic device detects that a screen display event occurs in step 501. For example, the electronic device detects that a specific image display function is selected or a specific moving picture reproduction function is selected depending on a user's touch.

The electronic device determines a Y value representing the brightness value of an image to display on the screen and changes the determined Y value to a voltage (i.e., Y voltage) in step 503. At this point, the electronic device can change the Y value of the image to display to the Y voltage using the display controller 122, that is, the display driver IC. Here, the Y value of the image is a value representing the relative brightness of the image. The Y value may be an average brightness value for the entire image obtained by setting a brightest portion of the relevant image to, e.g., 255, and setting a darkest portion of the relevant image to, e.g., 0.

In step 505, the electronic device determines whether the Y voltage of the image is less than a threshold voltage. At this point, the electronic device may have a comparator inside the display controller 122 or have a comparator inside the processor unit 100 to compare the Y voltage with the threshold voltage using the provided comparator.

When the Y voltage of the image is equal to or greater than the threshold voltage, the electronic device proceeds to step 515 to operate in the general mode. At this point, the electronic device allows respective self-light emitting devices to emit light depending on a supplied amount of current and express the color and the brightness of the relevant image by controlling the display driver IC to provide a current corresponding to the image to be displayed to the self-light emitting devices for a predetermined current supply time. The electronic device proceeds to step 517 to determine whether an event for displaying a different image occurs. When the event for displaying the different image occurs, the electronic device returns to step 503 to re-perform subsequent steps. In contrast, when the event for displaying the different image does not occur, the electronic device proceeds to step 513 to determine whether a display event ends. When a display event end occurs in step 513, the electronic device ends the procedure according to the present invention.

In contrast, when the Y voltage of the image is less than the threshold voltage, the electronic device switches an operation to the non-uniform emission remove mode in step 507, and proceeds to step 509 to reduce a current supply time by a predetermined amount or a predetermined ratio, and increase an amount of current corresponding to an image to be displayed by a predetermined amount or a predetermined ratio, and provide the increased amount of the current to the self-light emitting devices for the reduced current supply time. Accordingly, respective self-light emitting devices forming the display unit 124 of the electronic device may emit light depending on the supplied amount of the current to express the color and the brightness of the relevant image. At this point, when the Y value of the image is less than the threshold, the electronic device may switch to the non-uniform emission remove mode to express brightness using a higher amount of the current for a shorter time than the general mode, and distribute a linear emission efficiency over the entire panel within a range in which the user cannot recognize a brightness change, so that occurrence of the non-uniform emission phenomenon in a dark region of the relevant image can be prevented.

The electronic device proceeds to step 511 to determine whether an event for displaying a different image occurs. When the event for displaying the different image occurs, the electronic device returns to step 503 to re-perform subsequent steps. In contrast, when the event for displaying the different image does not occur, the electronic device proceeds to step 513 to determine whether a display event ends. When a display event end occurs in step 513, the electronic device ends the procedure according to the present invention.

Figure 6A:
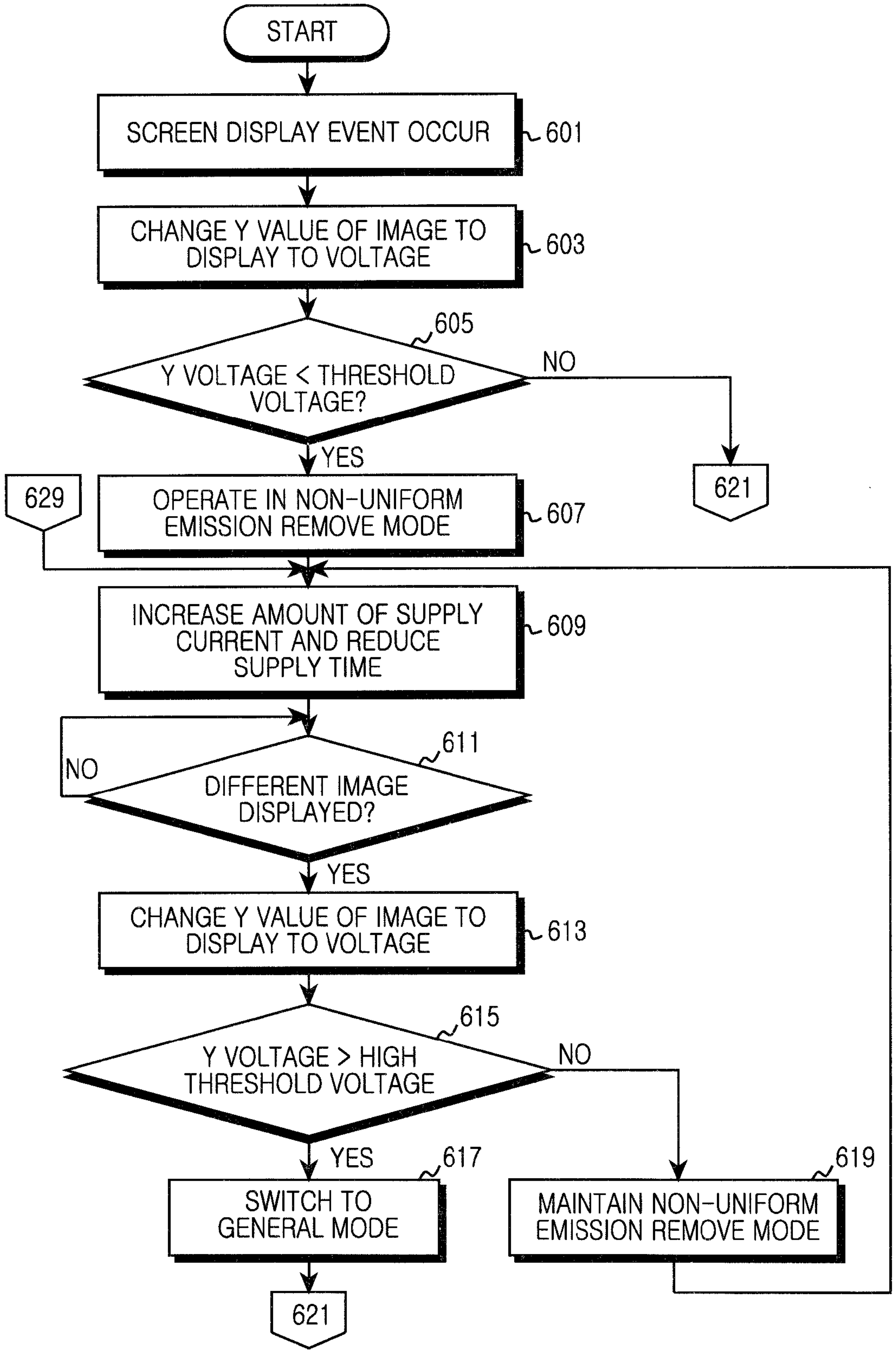
FIGS. 6A and 6B are flowcharts illustrating a procedure for displaying a moving picture depending on a voltage representing an image brightness value in an electronic device according to an exemplary embodiment of the present invention.
Figure 6B:
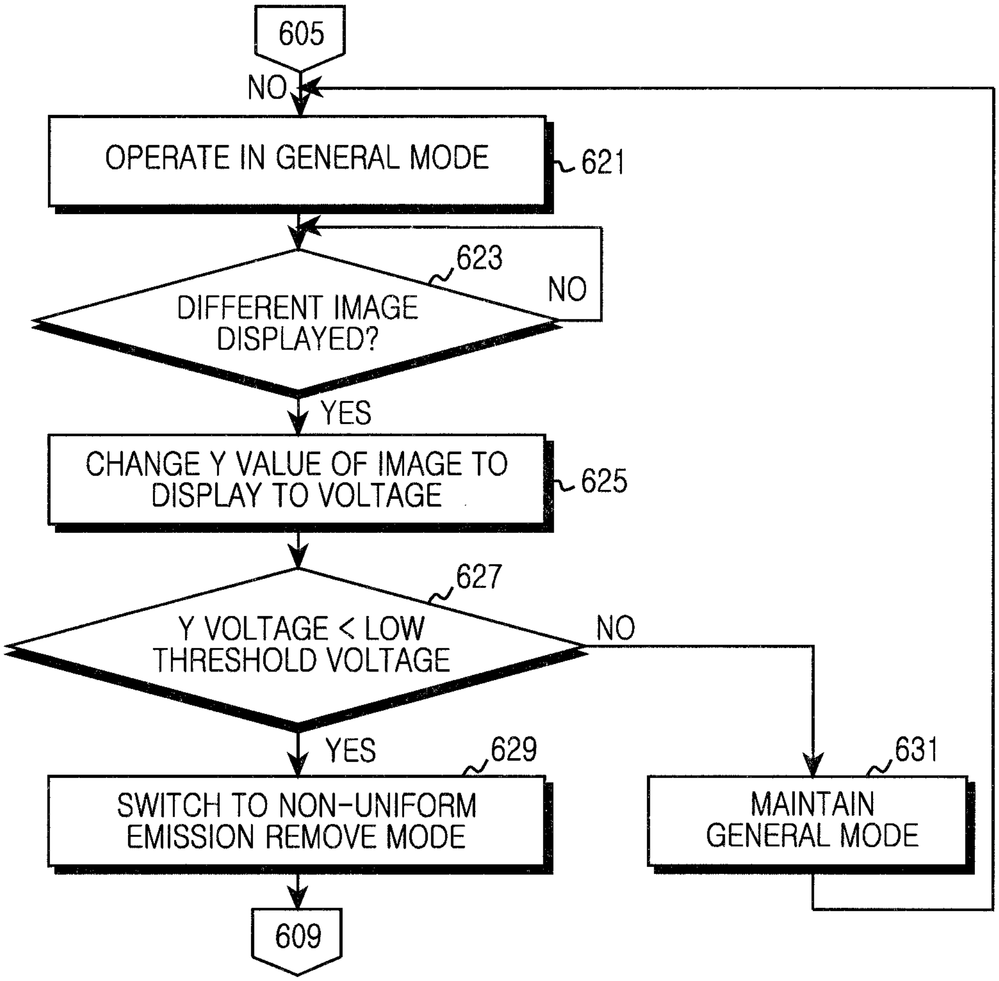

FIGS. 6A and 6B illustrate a procedure for displaying a moving picture depending on a voltage representing an image brightness value in an electronic device according to an exemplary embodiment of the present invention.

Referring to FIGS. 6A and 6B, the electronic device detects that a screen display event occurs in step 601. For example, the electronic device detects that a specific moving picture reproduce function is selected depending on a user's touch.

The electronic device determines a Y value representing the brightness value of an image to display on a screen, and changes the determined Y value to a voltage (i.e., Y voltage) in step 603. At this point, the electronic device can change the Y value of the image to display to the Y voltage using the display controller 122, that is, the display driver IC. Here, the Y value of the image is a value representing the relative brightness of the image. The Y value may be an average brightness value for the entire image obtained by setting a brightest portion of the relevant image to, e.g., 255, and setting a darkest portion of the relevant image to, e.g., 0.

The electronic device determines whether the Y voltage of the image to display on the screen is less than a threshold voltage in step 605. At this point, the electronic device may have a comparator inside the display controller 122 or have a comparator inside the processor unit 100 to compare the Y voltage with the threshold voltage using the provided comparator. At this point, the comparator may be a hysteresis comparator that normally feeds back a hysteresis voltage obtained by dividing a partial voltage of an output signal, and changes the output signal when an input Y voltage is greater or less than a reference voltage by the hysteresis voltage.

When the Y voltage of the image is equal to or greater than the threshold voltage, the electronic device proceeds to step 621 to operate in the general mode. At this point, the electronic device allows respective self-light emitting devices to emit light depending on a supplied amount of current and express the color and the brightness of a relevant image by controlling the display driver IC to provide a current corresponding to the image to be displayed to the self-light emitting devices for a predetermined current supply time. The electronic device proceeds to step 623 to determine whether an event for displaying a different image occurs. Here, since when reproducing a moving picture, the electronic device should sequentially display images forming the moving picture according to a predetermined rule, when a display time for the relevant image expires, an event for displaying a different image automatically occurs.

When the event for displaying the different event occurs, the electronic device determines a Y value representing the brightness value of the different image to display and changes the determined Y value to a voltage (i.e., Y voltage) in step 625. The electronic device determines whether the Y voltage of the image is less than a low threshold voltage in step 627. At this point, the low threshold voltage denotes a voltage lower by a hysteresis voltage than the threshold voltage. That is, the electronic device determines whether the Y voltage is less than the low threshold voltage using a hysteresis comparator.

When the Y voltage is equal to or greater than the low threshold voltage, the electronic device maintains the general mode in step 631, and returns to step 621 to perform subsequent steps. In contrast, when the Y voltage is less than the low threshold voltage, the electronic device proceeds to step 629 to switch from the general mode to the non-uniform emission remove mode, and proceeds to step 609 to perform subsequent steps. That is, to prevent mode switching from occurring too frequently depending on a Y value of an image while reproducing a moving picture, even when a Y voltage is less than the threshold voltage, in the case where the Y voltage is equal to or greater than the low threshold voltage, the electronic device does not switch to the non-uniform emission remove mode but maintains the general mode. Only when the Y voltage is less than the low threshold voltage does the electronic device switch to the non-uniform emission remove mode.

In contrast, when it is determined in step 605 that the Y voltage of the image is less than the threshold voltage, the electronic device switches an operation to the non-uniform emission remove mode in step 607, and proceeds to step 609 to reduce a current supply time by a predetermined amount or a predetermined ratio, increase an amount of current corresponding to an image to be displayed by a predetermined amount or a predetermined ratio, and provide the increased amount of the current to self-light emitting devices for the reduced current supply time. Accordingly, respective light emitting devices forming the display unit 124 may emit light depending on a supplied amount of current to express the color and the brightness of the relevant image. At this point, when the Y value of the image is less than the threshold, the electronic device may switch to the non-uniform emission remove mode to express brightness using a higher amount of the current for a shorter time than the general mode, and distribute a linear emission efficiency over the entire panel within a range in which the user cannot recognize a brightness change, so that occurrence of the non-uniform emission phenomenon in a dark region of the relevant image can be prevented.

In step 611, the electronic device determines whether an event for displaying a different image occurs. Here, since when reproducing a moving picture, the electronic device should sequentially display images forming the moving picture according to a predetermined rule, when a display time for the relevant image expires, an event for displaying a different image automatically occurs.

When the event for displaying the different event occurs, the electronic device determines a Y value representing the brightness value of the different image to display and changes the determined Y value to a voltage (Y voltage) in step 613. In step 615, the electronic device determines whether the Y voltage of the image is greater than a high threshold voltage.

At this point, the high threshold voltage denotes a voltage higher by the hysteresis voltage than the threshold voltage. That is, the electronic device determines whether the Y voltage is greater than the high threshold voltage using the hysteresis comparator.

When the Y voltage is greater than the high threshold voltage, the electronic device switches from the non-uniform emission remove mode to the general mode in step 617, and proceeds to step 621 to re-perform subsequent steps. In contrast, when the Y voltage is equal to or less than the high threshold voltage, the electronic device proceeds to step 619 to maintain the non-uniform emission remove mode, and returns to step 609 to re-perform subsequent steps. That is, to prevent mode switching from occurring too frequently depending on a Y value of an image while reproducing a moving picture, even when a Y voltage is equal to or greater than the threshold voltage, in the case where the Y voltage is equal to or less than the high threshold voltage, the electronic device does not switch to the general mode but maintains the non-uniform emission remove mode. Only when the Y voltage is greater than the high threshold voltage, the electronic device switches to the general mode.

According to exemplary embodiments of the present invention, an electronic device operates in the non-uniform emission remove mode or the general mode depending on the brightness value of an image to control an amount of current to be supplied to a self-luminous display device and a current supply time, thereby controlling light emission of the self-luminous display device in a low brightness region, that is, a dark region expressing grayscales to prevent non-uniform emission phenomenon from occurring. Also, the electronic device has an effect of resolving a phenomenon that brightness gradation is not linear but inversed in an image where grayscale is expressed variously. Also, the electronic device has an effect of preventing mode switching between the non-uniform emission remove mode and the general mode from frequently occurring depending on a dynamically changing image brightness value using a hysteresis comparator while reproducing a moving picture.

It will be appreciated that exemplary embodiments of the present invention according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present invention. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing an apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method in an electronic device, the method comprising:
- entering a non-uniform emission remove mode when a brightness value of an entire image to be displayed is less than a threshold value;
- determining, in the non-uniform emission remove mode, an amount of a supply current and a current supply time according to the brightness value; and
- supplying the determined amount of the supply current to a self-light emitting device during the determined current supply time,
- wherein the determined current supply time is shorter than a current supply time of a normal mode, during one frame period,
- wherein the determining of the amount of the supply current comprises:
  - changing the brightness value of the entire image to a voltage;
  - comparing the voltage with a predetermined threshold voltage;
  - when the voltage is less than the predetermined threshold voltage, increasing the amount of the supply current corresponding to the entire image by a predetermined amount or a predetermined ratio; and
  - when the voltage is equal to or greater than the predetermined threshold voltage, maintaining the amount of the supply current corresponding to the entire image;
- the method further comprising:
- switching a current supply mode based on a result of the comparison of the voltage with the predetermined threshold voltage by:
  - when the voltage is less than the predetermined threshold voltage, switching to the non-uniform emission remove mode including increasing an amount of the supply current;
  - when the voltage is equal to or greater than the predetermined threshold voltage, switching to the normal mode including maintaining the amount of the supply current; and
  - when reproducing a moving picture at the electronic device:
    - comparing the voltage for the brightness value of the entire image with a high threshold voltage greater by a predetermined voltage than the predetermined threshold voltage while operating in the non-uniform emission remove mode;
    - when the voltage is equal to or less than the high threshold voltage, maintaining the non-uniform emission remove mode; and
    - when the voltage is greater than the high threshold voltage, switching to the normal mode.

2. The method of claim 1, wherein the determining of the amount of the supply current comprises:
- comparing the brightness value of the entire image with a predetermined threshold; and
- when the brightness value of the entire image is less than the predetermined threshold, increasing the amount of the supply current corresponding to the entire image by a predetermined amount or a predetermined ratio, and when the brightness value of the entire image is equal to or greater than the predetermined threshold, maintaining the amount of the supply current corresponding to the entire image.

3. The method of claim 2, further comprising determining the current supply time based on the amount of the supply current of normal mode and the brightness value of the entire image.

4. The method of claim 3, wherein the determining of the current supply time comprises:

comparing the brightness value of the entire image with the predetermined threshold; and when the brightness value of the entire image is less than the predetermined threshold, reducing the current supply time by a predetermined time or a predetermined ratio, and when the brightness value of the entire image is equal to or greater than the predetermined threshold, maintaining the current supply time.

5. The method of claim 4, wherein the amount of the supply current and the current supply time are determined such that a total amount of energy consumed when the brightness value of the entire image is less than the predetermined threshold is the same as a total amount of energy consumed when the brightness value of the entire image is equal to or greater than the predetermined threshold.

6. The method of claim 1, wherein, when reproducing a moving picture at the electronic device, the switching of the current supply mode comprises:

comparing the voltage for the brightness value of the entire image with a low threshold voltage smaller by a predetermined voltage than the predetermined threshold voltage while operating in the normal mode;

when the voltage is equal to or greater than the low threshold voltage, maintaining the normal mode; and when the voltage is less than the low threshold voltage, switching to the non-uniform emission remove mode.

7. The method of claim 1, wherein the normal mode is a mode for supplying the maintained amount of the supply current to the self-light emitting device for a predetermined current supply time, and the non-uniform emission remove mode is a mode for supplying the increased amount of the supply current to the self-light emitting device for a time shorter than the predetermined current supply time.

8. An electronic device comprising:

a self-luminous display device comprising a plurality of self-light emitting devices;

a comparator for comparing an input voltage with a predetermined threshold voltage; and a processor configured to control to:

enter a non-uniform emission remove mode when a brightness value of an entire image to be displayed is less than a threshold value;

determine, in the non-uniform emission remove mode, an amount of a supply current and a current supply time according to the brightness value;

supply the determined amount of the supply current to the self-light emitting device during the determined current supply time;

change the brightness value of the entire image to a voltage;

transfer the changed input voltage to the comparator;

when the input voltage is less than the predetermined threshold voltage, increase the amount of the supply current corresponding to the entire image by a predetermined amount or a predetermined ratio;

when the input voltage is equal to or greater than the predetermined threshold voltage, maintain the amount of the supply current corresponding to the entire image;

switch a current supply mode based on a result of the comparison of the voltage with the predetermined threshold voltage by:

when the input voltage is less than the predetermined threshold voltage, switching to the non-uniform emission remove mode including increasing an amount of the supply current;

when the input voltage is equal to or greater than the predetermined threshold voltage, switching to the normal mode including maintaining the amount of the supply current; and when reproducing a moving picture at the electronic device:

compare the input voltage with a high threshold voltage greater by a predetermined voltage than the predetermined threshold voltage while operating in the non-uniform emission remove mode;

when the input voltage is equal to or less than the high threshold voltage, maintain the non-uniform emission remove mode; and when the input voltage is greater than the high threshold voltage, switch to the normal mode, wherein the determined current supply time is shorter than a current supply time of a normal mode, during one frame period.

9. The electronic device of claim 8, wherein the processor is further configured to control to compare the brightness value of the entire image with a predetermined threshold, when the brightness value of the entire image is less than the predetermined threshold, increase the amount of the supply current corresponding to the entire image by a predetermined amount or a predetermined ratio, and when the brightness value of the entire image is equal to or greater than the predetermined threshold, maintain the amount of the supply current corresponding to the entire image.

10. The electronic device of claim 9, wherein the processor is further configured to control to determine the current supply time based on the amount of the supply current of the normal mode and the brightness value of the entire image.

11. The electronic device of claim 10, wherein the processor is further configured to control to compare the brightness value of the entire image with the predetermined threshold, when the brightness value of the entire image is less than the predetermined threshold, reduce the current supply time by a predetermined time or a predetermined ratio, and when the brightness value of the entire image is equal to or greater than the predetermined threshold, maintain the current supply time.

12. The electronic device of claim 11, wherein the processor is further configured to control to determine the amount of the supply current and the current supply time such that a total amount of energy consumed when the brightness value of the entire image is less than the predetermined threshold is the same as a total amount of energy consumed when the brightness value of the entire image is equal to or greater than the predetermined threshold.

13. The electronic device of claim 8, wherein the processor is further configured to control to when reproducing a moving picture at the electronic device, switch the current supply mode, compare the input voltage with a low threshold voltage smaller by a predetermined voltage than the predetermined threshold voltage while operating in the normal mode, when the input voltage is equal to or greater than the low threshold voltage, maintain the normal mode, and when the input voltage is less than the low threshold voltage, switch to the non-uniform emission remove mode.

14. The electronic device of claim 8, wherein the normal mode is a mode for supplying the maintained amount of the supply current to the self-light emitting device for a predetermined current supply time, and the non-uniform emission remove mode is a mode for supplying the increased amount of the supply current to the self-light emitting device for a time shorter than the predetermined current supply time.

* * * * *